_United States Patent_ [19]

Davis

[11] Patent Number: 5,252,015
[45] Date of Patent: Oct. 12, 1993

[54] ADJUSTABLE PRE-LOAD SCREW AND NUT ASSEMBLY

[76] Inventor: Walter S. Davis, 7159 Echo Ridge Dr., San Jose, Calif. 95120

[21] Appl. No.: 787,119

[22] Filed: Nov. 4, 1991

[51] Int. Cl.⁵ .............................................. F16B 39/12
[52] U.S. Cl. .................................... 411/231; 411/312; 411/433
[58] Field of Search ............... 411/202, 203, 231, 222, 411/223, 247, 1, 6, 7, 312, 301, 237, 239, 240, 241, 432, 433

[56] References Cited

U.S. PATENT DOCUMENTS

| | | | |
|---|---|---|---|
| 453,660 | 6/1891 | Reynard | 411/203 X |
| 723,373 | 3/1903 | Duryea et al. | 411/223 X |
| 1,183,556 | 5/1916 | Green | 411/222 |
| 1,604,445 | 10/1926 | Hem | 411/231 |
| 2,840,404 | 6/1958 | Weber, Jr. | 411/433 X |
| 3,030,996 | 4/1965 | Doerr | 411/14 X |
| 4,431,354 | 2/1984 | Griffin | 411/301 |
| 4,872,795 | 10/1989 | Davis | 411/433 |

FOREIGN PATENT DOCUMENTS

| | | | |
|---|---|---|---|
| 172844 | 10/1952 | Austria | 411/239 |
| 306291 | 8/1971 | U.S.S.R. | 411/239 |
| 1177565 | 9/1985 | U.S.S.R. | 411/432 |
| 1303751 | 4/1987 | U.S.S.R. | 411/240 |
| 523403 | 7/1940 | United Kingdom | 411/223 |
| 2233058 | 1/1991 | United Kingdom | 411/433 |

_Primary Examiner_—Rodney M. Lindsey
_Attorney, Agent, or Firm_—Paul B. Fihe

[57] ABSTRACT

An adjustable pre-load screw and nut assembly is described including a screw with external helical threads and a nut having two separate portions each with internal threads complementary to those on the screw. An adjustment nut and adjacent O-ring can be turned an amount sufficient to interengage the nut portions to urge them apart and thus establish contact with opposing surfaces of the screw threads to effect pre-loaded contact therewith to eliminate backlash when the screw is turned in either direction.

6 Claims, 1 Drawing Sheet

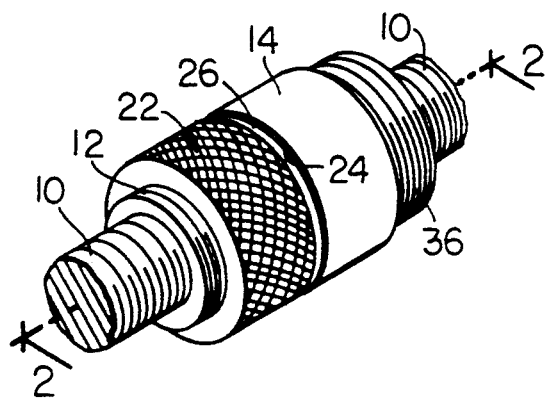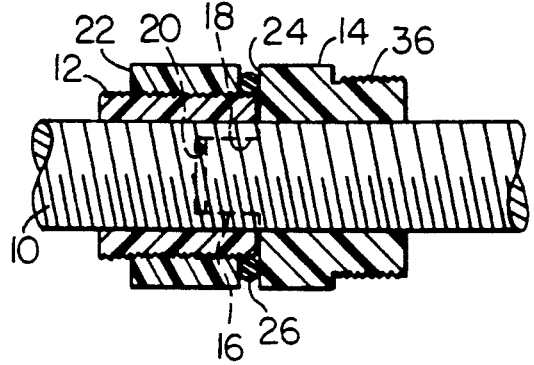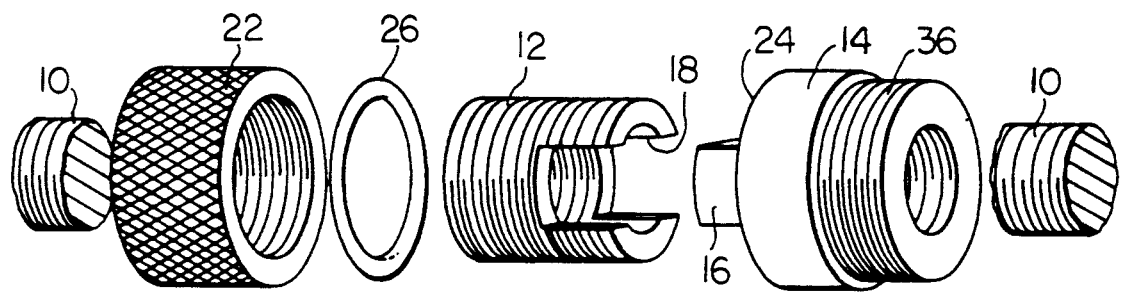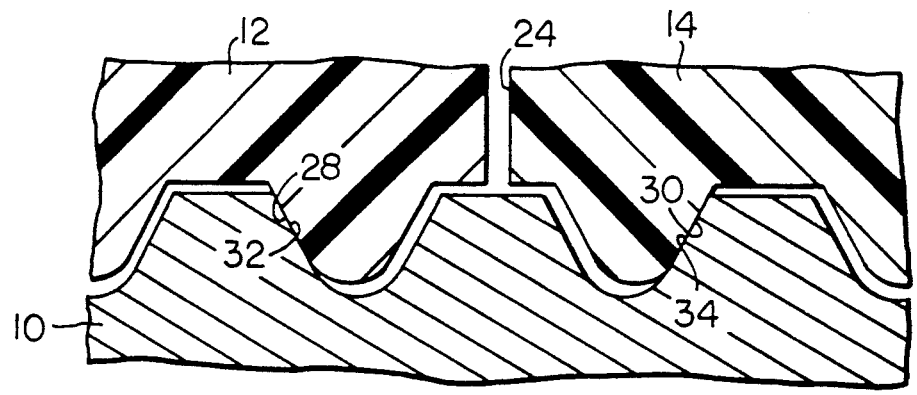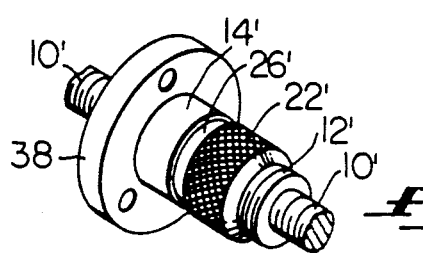

ADJUSTABLE PRE-LOAD SCREW AND NUT ASSEMBLY

The present invention relates generally to lead screw and nut assemblies and more particularly to a precision assembly preventing backlash.

BACKGROUND OF THE INVENTION

An essential element of leadscrew applications requiring close tolerance repeatability, is the elimination of backlash or "slop" between the fit of the follower nut and leadscrew. Historically, the method used to eliminate this lost motion or backlash has been to load one nut against another nut. This method works satisfactorily when the lead of the screw and nut is very consistent and lead accuracy is very high. However, the double nut method runs into difficulty when there are lead inaccuracies and inconsistencies in the leadscrew. Torque spikes and binding are caused by these inconsistent leads.

The increasing use of low cost, rolled thread leadscrews with their inherent lead inconsistency and inaccuracy has created a need for a follower nut able to operate smoothly on this and other similar types of leadscrews.

An additional need has been for a follower nut capable of adjustment due to wear of the screw and/or nut.

SUMMARY OF THE PRESENT INVENTION

Accordingly it is the general objective of the present invention to provide a simple screw and nut assembly with an adjustable preload to accommodate wear and thus extend the useful life thereof.

To achieve such objective, the assembly includes an elongated screw having a consistent helical thread pattern on its exterior.

A nut formed by two separate portions each having internal threads complementary to those on the screw exterior is mounted thereon so as to move along the screw when the latter is rotated.

A tongue on one nut portion is arranged to enter a slot on the other nut portion to preclude relative rotation therebetween but still permit slight axial displacement therebetween thus allowing for adjustment of the screw-nut pre-load.

Means are provided for interengaging the two nut portions for such slight axial adjustment and preferably includes an adjustment nut interiorally threaded for contact with mating exterior threads on one nut portion to develop force when turned against the other nut portion. Thus, turning of this adjustment nut will effect adjustment of the pre-load between the flanks of the screw and nut portions.

A resilient member in the form of a rubber O-ring is interposed between adjacent but slightly axially spaced surfaces on the nut portions to urge them apart from one another.

BRIEF DESCRIPTION OF THE DRAWING

The stated objective of the invention and the manner in which it is achieved, as summarized above will be more fully understood by reference to the accompanying drawing wherein:

FIG. 1 is a perspective view of a screw and nut assembly embodying the invention, FIG. 2 is a central sectional view taken along line 2—2 of FIG. 1, FIG. 3 is an exploded perspective view showing details of the parts of the FIG. 1 structure, FIG. 4 is a greatly enlarged fragmentary sectional view illustrating thread contact details, and FIG. 5 is a perspective view similar to FIG. 1 of a slightly modified embodiment of the invention.

DETAILED DESCRIPTION OF THE ILLUSTRATED EMBODIMENTS OF THE INVENTION

With initial reference to FIGS. 1, 2 and 3, the adjustable pre-load screw and nut assembly embodying the present invention includes a hard screw 10, preferably formed from steel and having a helical thread pattern on its exterior.

A nut is formed by two separate nut portions 12, 14, each having interior threads complementary to the external threads on the screw 10. As a consequence, when the screw 10 is turned, for example by an electric motor (not shown) the nut portions 12, 14, will advance linearly together along the screw. A tongue 16 extends axially from the nut portion 14 to enter a registering slot 18 in the nut portion 12, thus to preclude relative rotation between the two portions 12, 14 of the nut. As can be best seen in FIG. 2, the slot 18 is deeper than the tongue 16 thus leaving a space 20 allowing axial adjustment. of the nut portions 12, 14.

To provide adjustment of the nut pre-load against the screw 10, the nut portion 12 has exterior threads which are complementary to the interior threads on an adjustment nut 22 having a knurled exterior to enable manual advance thereof toward a shoulder 24, on the other nut portion 14. A resilient O-ring 26 is interposed between the adjustment nut 22 and the shoulder 24 thus resiliently urging the two nut portions 12, 14 apart. When the adjustment nut 22 is tightened and moves to the right, as shown in FIG. 2, the nut portions are urged apart with the urging of the O-ring 26 and thus bring opposed flanks 28, 30 of the nut threads into intimate contact with the adjacent flanks 32, 34 on the screw as clearly illustrated in FIG. 4. Thus, there will be no backlash when the screw 10 rotates in either direction. Furthermore, the O-ring 26 prevents binding or torque variation due to inconsistency of the screw.

The contact pressure (pre-load) is determined by turning of the adjustment nut 22 and is preferably set at a low level to create low drag torque thus minimizing wear and in many instances enabling use of a smaller motor to turn the screw 10.

It is also notable that after wear of the screw 10 and/or nut portions 12, 14 the adjustment nut 22 can be tightened to accommodate such wear.

All portions of the nut are preferably formed by a durable thermoplastic material which has long life, light weight, and low friction so that it can be used with or without lubrication. It is also a low cost material and can be readily fabricated. However, other materials such as bronze, brass or steel can also be used for fabrication of the nut portions.

External threads 36 on the nut portion 14 enable connection to the part being moved (not shown), and as an alternative shown in FIG. 5 a mounting flange 38 can be joined to nut portions 14', the FIG. 5 structure being otherwise the same shown in the first embodiment of the invention and thus having corresponding parts being indicated by corresponding numbers with an added prime rotation.

Various modifications and/or alterations can be made in the described structures without departing from the spirit of the invention and scope of the invention is to be indicated only by the appended claims.

What is claimed is:

1. An adjustable pre-load nut assembly arranged for translation movement along a screw, in response to rotation of the screw which comprises a first nut portion having an internal thread complementary to the external thread of the screw, a second nut portion also having an internal thread complementary to the external thread of the screw, and means interengaging said nut portions for relative axial adjustment, including an adjustment nut connected to one of said first and second nut portions for axial adjustment thereon, and resilient means interposed between said adjustment nut and one of said nut portions to establish the only contact therebetween for urging said nut portions in axially opposite directions.

2. An adjustable pre-load nut assembly according to claim 1 wherein said interengaging means urges said nut portions away from one another.

3. An adjustable pre-load nut assembly according to claim 1 which comprises second means on said nut portions interengaging to preclude relative rotation of said nut portions.

4. An adjustable pre-load nut assembly according to claim 1 wherein said resilient means urges said nut portions away from one another in an axial direction.

5. An adjustable pre-load nut assembly according to claim 4 wherein said resilient means is a resilient O-ring interposed between said adjustment nut and one of said nut portions.

6. An adjustable pre-load screw and nut assembly which comprises an elongated screw having a helical thread pattern on its exterior, a first nut portion having an internal thread complementary to the external thread on said screw, a second nut portion having an internal thread complementary to the external thread on said screw, and means interengaging said nut portions for relative axial adjustment, including an adjustment nut connected to one of said first and second nut portions for axial adjustment thereon, and resilient means interposed between said adjustment nut and one of said nut portions to establish the only contact therebetween for urging said nut portions in axially opposite directions.

* * * * *